United States Patent
Tayama et al.

(10) Patent No.: US 6,231,637 B1
(45) Date of Patent: May 15, 2001

(54) PROCESS FOR PRODUCING HIGH-PURITY SILVER MATERIALS

(75) Inventors: Kishio Tayama, Hachioji; Takashi Ohgami, Tokyo; Hiroshi Miura, Yokohama, all of (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/256,115

(22) Filed: Feb. 24, 1999

Related U.S. Application Data

(62) Division of application No. 08/814,112, filed on Mar. 10, 1997, now abandoned.

(30) Foreign Application Priority Data

Jun. 21, 1996 (JP) .................................................. 8-181362

(51) Int. Cl.[7] .................................................. B22F 9/16
(52) U.S. Cl. .................................................. 75/367; 75/634
(58) Field of Search ........................................ 75/367, 634

(56) References Cited

U.S. PATENT DOCUMENTS

| | | | |
|---|---|---|---|
| 3,165,396 | * 1/1965 | Goon | 75/367 |
| 4,488,902 | 12/1984 | Hunt . | |
| 4,518,418 | 5/1985 | Fletcher et al. . | |
| 4,976,792 | 12/1990 | Sawada | 148/404 |
| 5,573,861 | 11/1996 | Takahashi et al. | 428/621 |

FOREIGN PATENT DOCUMENTS

| | | |
|---|---|---|
| 56-169341 | 12/1981 | (JP) . |
| 60-208434 | 10/1985 | (JP) . |
| 60-224720 | 11/1985 | (JP) . |
| 61-163504 | 7/1986 | (JP) . |
| 61-163505 | 7/1986 | (JP) . |
| 63-105908 | * 5/1988 | (JP) .................................. 75/367 |
| 6-225891 | 8/1994 | (JP) . |
| 6-279992 | 10/1994 | (JP) . |

OTHER PUBLICATIONS

Fujioko, M., "Line Cable/Ortophone," *A & V Village*, No. 27, Oct. 1, 1997, p. 21, 1997.*
"Super High Purity Silver Cables", Ortofon Catalog, Ortofon Japan Co., Ltd., No date.*
Fujioka, M., "Special Feature: Equipment Selection by Audiophiles", Stereo 1997, 10, Oct. 1997, pp. 85–87, 1997.*
E.M. Savitski, *Handbook of Precious Metals*, p. 529, (1989).

* cited by examiner

*Primary Examiner*—George Wyszomierski
(74) *Attorney, Agent, or Firm*—Frishauf, Holtz, Goodman, Langer & Chick, P.C.

(57) ABSTRACT

A process for producing a high-purity silver material comprising placing a silver feed in a crucible disposed in a furnace comprising an inner cylinder which encloses the crucible and an outer cylinder which encloses the inner cylinder; heating the silver feed at a temperature not lower than 1065° C. and at a pressure not higher than 0.1 Pa such that the silver evaporates and condenses on the ceiling of the inner cylinder to yield silver particles; and collecting silver particles in a recovery mold disposed beneath the crucible and within the inner cylinder, such that gold, copper and other impurities having a lower vapor pressure than silver remain within the crucible, whereas sulfur, sodium and the other impurities having a higher vapor pressure than silver are withdrawn by a vacuum pump and are then introduced into a cooling trap disposed beneath the recovery mold, such that the higher vapor pressure impurities are solidified in the cooling trap.

11 Claims, 1 Drawing Sheet

PROCESS FOR PRODUCING HIGH-PURITY SILVER MATERIALS

This is division of application Ser. No. 08/814,112 filed Mar. 10, 1997, abandoned.

BACKGROUND OF THE INVENTION

1. Field of the Invention

This invention relate to silver wires for use in video display apparatus such as VTR or TV or in audio equipment.

2. Background Information

Conductors conventionally used in recording, acoustic or image transmission applications are made of annealed copper wires, which are produced by cold working oxygen-free or tough pitch copper with a purity of about 99.9 wt % followed by annealing, or copper wires prepared by plating such annealed copper wires.

With copper wires having purities on the order of 99.9 wt %, signals cannot be transmitted correctly without phase differences and, as a result, only blurred images or unsharp sounds are produced. To solve these problems, high-purity copper wires produced by working raw materials having purities of at least 99.999 wt % have recently been introduced into the market.

Similar effects are exhibited by silver wires that are produced by a process which comprises solidifying silver with a purity of at least 99.95 wt % in one longitudinal direction to yield an ingot, drawing it by either cold or warm working and further working the wire under conditions that will not cause recrystallization. This process is described in Unexamined Published Japanese Patent Application No.163505/1986 under the title of "A Process for Producing Conductors for Use in Video Display Apparatus or Audio Equipment". However, the demand of the market has solely been for high-purity copper wires.

Thus, in the metal purifying technology, 6N and 7N copper materials have successfully been developed (purities of at least 99.9999 wt % will hereunder be designated as "6N" and purities of at least 99.99999 wt % as "7N"); on the other hand, practically feasible methods of purifying silver materials are yet to be developed and no silver wires of high purity have been produced that can be tested for their performance to thereby obtain data that compare with high-purity copper wires.

SUMMARY OF THE INVENTION

An object, therefore, of the invention is to establish a process for producing high-purity silver materials by novel means and thereafter work them into wires, thereby providing high-purity silver wires suitable for use in recording, acoustic or image transmission applications.

The present inventors conducted intensive studies with a view to attaining the stated object and found that by using a special vacuum distillation refiner, high-purity silver with a purity of at least 99.9999 wt % could be obtained that had a total impurity content of less than 1 ppm as measured by glow discharge mass spectrometric analysis. When high-purity silver wires drawn from this raw material were assembled into video display apparatus or audio equipment, there could be produced images or sounds that were sharper than those obtained with the conventional high-purity copper wires. The present invention has been accomplished on the basis of this finding.

Thus, the stated object of the invention can be attained by a high-purity silver wire for use in recording, acoustic or image transmission applications, which contains sulfur, iron, copper, palladium, gold and lead in such amounts that none of them will exceed 0.5 ppm as they are taken individually and wherein any other impurities that can be measured in amount not less than the respective lower limits of detection add up to less than 1 ppm.

DETAILED DESCRIPTION OF THE INVENTION

Figure 1:
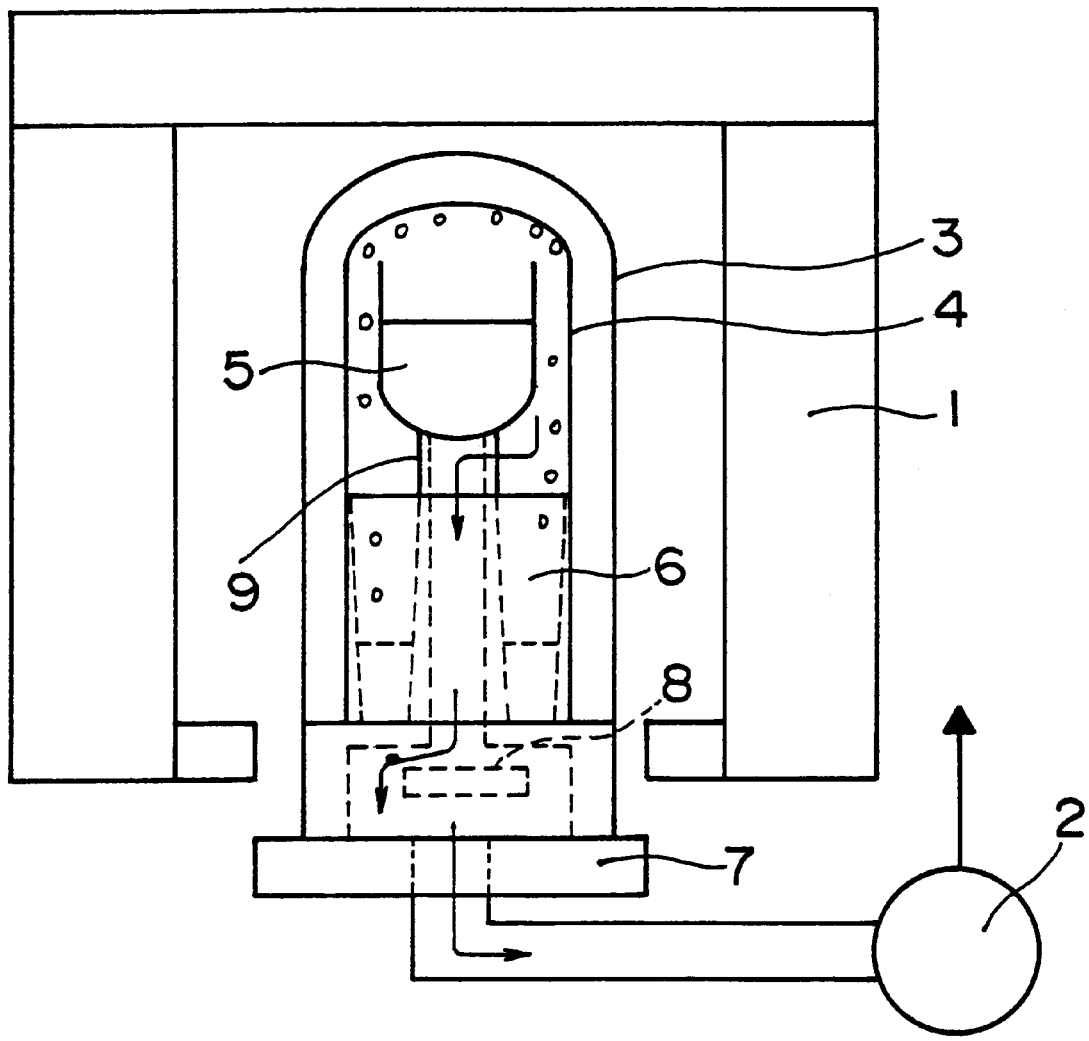
FIG. 1 is a vertical section showing schematically an apparatus for producing the high-purity silver of the present invention.

An exemplary apparatus for producing high-purity silver for use in the present invention is shown schematically in FIG. 1. An electric furnace 1 contains an outer quartz cylinder 3 which is adapted to be capable of being evacuated with a vacuum pump 2. The outer cylinder 3 contains a feed crucible 5, a recovery mold 6, a cooling trap 8 and a water-cooled flange 7 that are connected together in a detachable manner, and an inner quartz cylinder 4 is mounted over the feed crucible.

A suitable amount of silver feed (with a purity of about 99.99 wt %) is charged into the crucible 5 and heated in the electric furnace at a temperature of at least 1065° C., preferably between 1200 and 1350° C., with the degree of vacuum being controlled at 0.1 Pa or below, preferably 0.02 Pa or below; as a result, the silver feed in the crucible evaporates and condenses on the ceiling of the inner quartz cylinder to yield purified silver particles, which drop between the crucible 5 and the inner quartz cylinder 4 and thereafter fall into the recovery mold 6 which is connected to the bottom of the crucible.

While the silver feed contains various kinds of impurities, those which have lower vapor pressures than silver such as gold, copper, palladium and iron will remain in the crucible 5 whereas those having higher vapor pressures such as sulfur, sodium, calcium and lead will not condense but remain in a gaseous form that is withdrawn by means of the vacuum pump 2 to be introduced into the cooling trap 8 via a suction hole in the bottom of the crucible; thereafter, those impurity gases are cooled to solidify by the action of the water-cooled flange 7.

In the present invention, the recovery mold already assumes the shape of the mold which is to be used in a step subsequent to the purifying process; hence, there is no need to recast the purified silver as in the prior art and less contaminated high-purity silver can be produced by a simple process having no distinction between purifying and casting stages.

Then, with the temperature in the recovery mold maintained at 1300° C., the silver is hot- and cold-worked into a wire (1.5 mm$^\phi$) under ordinary conditions. Analysis with a glow discharge mass spectrometer revealed that none of the sulfur, iron, copper, palladium, gold and lead contents was more than 0.5 ppm whereas other impurities such as sodium, silicon, potassium, calcium, chromium and nickel, of which the detection limits on the glow discharge mass spectrometer were each 0.1 ppm and below, were present in a total amount of less than 1 ppm.

The following example is provided for the purpose of further illustrating the present invention but is in no way to be taken as limiting.

EXAMPLE

FIG. 1 is a vertical section showing schematically the apparatus for producing the high-purity silver of the invention and reference will be made to this Figure in the following description.

First, 100 g of electrolytic silver with a purity of 99.99 wt % was charged into a feed crucible 5, which was fixed onto an aspiration table 9 installed in the center of a recovery mold 6. The assembly was then set up in an electric furnace 1 as shown in FIG. 1.

The feed crucible 5 and the recovery mold 6 were enclosed with an outer cylinder 3 and an inner cylinder 4 both of which were made of quartz. A vacuum pump 2 would cause the air within the inner cylinder 4 to be withdrawn through a hole (not shown) in the upper part of the aspiration table 9 until a vacuum was drawn into the inner cylinder 4.

After the feed crucible 5 was set up in the electric furnace 1, the vacuum pump 2 was operated to lower the pressure in the inner cylinder 4 down to 0.01 Pa. Upon 5-min purification at a furnace temperature of 1300° C., the silver in the feed evaporated and contacted the ceiling of the inner cylinder 4 over the feed crucible 5, whereupon it began condensing slowly to form particles, which dropped into the recovery mold 6 provided beneath the feed crucible 5.

Impurities in the feed that had higher vapor pressures than silver remained gaseous and were aspirated by means of the vacuum pump to pass through the holes in the upper part of the aspiration table and thereafter solidified on the cooling trap. Analysis showed that the solidified product was chiefly composed of substances of high vapor pressure such as sulfur, sodium, calcium and lead. The metal left in the feed crucible was also analyzed, revealing that it was chiefly composed of substances of low vapor pressure such as gold, copper, palladium and iron.

In the next step, the purified silver in the recovery mold 6 was drawn into a silver wire (11 mm$^\Phi$) as it was cooled by passage through a withdrawing port (not shown) provided on a lateral side of the mold. The thus prepared raw material was hot- and cold-drawn under ordinary conditions into a thinner silver wire having a diameter of 1.5 mm. The silver wire was then analyzed for the concentration of impurities by means of a glow discharge mass spectrometer and the results are shown in Table 1.

The high-purity silver wire was further drawn to a diameter of 0.1 to 0.3 mm. A plurality of such wires were prepared, braided together and extrusion coated with a resin (PVC) insulator. Alternatively, individual wires were coated with the same insulator. Such wires were processed into speaker cords and audio pin cords, each of the latter being fitted with a plug on both ends; the cords were connected to a stereophonic system for sound reproduction. For comparison, commercial 4N and 6N copper wires were processed into the same cords and connected to the stereophonic system. The sound reproduced with the high-purity silver wires of the present invention had very high levels of reverberation at high pitch, provided a very good sound field effect, offered very good localization and was characterized by salient tone colors.

TABLE 1

| Impurity levels, ppm | | | | | | |
|---|---|---|---|---|---|---|
| | Na | Si | S | K | Ca | Cr | Fe |
| Example 1 | <0.01 | <0.01 | 0.05 | <0.01 | <0.01 | <0.01 | 0.04 |
| | Ni | Cu | Pd | Au | Pb | | |
| Example 1 | <0.01 | 0.01 | <0.01 | <0.1 | <0.01 | | |

The high-purity silver wires of the invention were also compared with the conventional products in terms of image quality. The results are shown in Table 2; very sharp images were produced with the wires according to the present invention.

TABLE 2

| Invention | Image sharpness | Acoustic quality |
|---|---|---|
| Ag wire | Very sharp | Very high reverberation of treble level and good woofing of bass level |
| 4N Cu wire | Less sharp | Acceptable |
| 6N Cu wire | Moderate | Very high reverberation of treble level |

As described above, the present inventions for the first time succeeded in establishing a practically feasible process for the production of very high-purity silver (>99.9999 wt %) and the high-purity silver wire of the invention can be easily prepared by drawing the very-high purity silver produced by that process. Using the thus prepared silver wire, one can realize further improvements in acoustic and image characteristics.

What is claimed is:

1. A process for producing a high-purity silver material which comprises:
    (a) placing a silver feed in a crucible disposed in a furnace, said furnace comprising an inner cylinder which encloses said crucible and an outer cylinder which encloses the inner cylinder, said inner cylinder having a ceiling;
    (b) heating the silver feed within the crucible to a temperature of 1200 to 1350° C. and at a pressure of 0.02 Pa or less such that the silver evaporates and condenses on the ceiling of the inner cylinder to yield silver particles; and
    (c) recovering the silver particles in a recovery mold disposed beneath the crucible and within the inner cylinder for purifying the silver, such that gold, copper and other impurities having a lower vapor pressure than silver remain within the crucible, whereas sulfur, sodium and the other impurities having a higher vapor pressure than silver are withdrawn by a vacuum pump and are introduced into a cooling tray disposed beneath the recovery mold, said impurities having a higher vapor pressure than silver being solidified in said cooling trap.

2. The process according to claim 1, wherein the outer cylinder is a quartz cylinder.

3. The process according to claim 2, wherein the inner cylinder is a quartz cylinder.

4. The process according to claim 1, wherein the silver feed has a purity of about 99.99 weight %.

5. The process according to claim 4, wherein the temperature is 1300° C. and the pressure is 0.01 Pa.

6. The process according to claim 1, wherein the silver feed has a purity of about 99.99 weight % and the high-purity silver has a purity of at least 99.9999 weight %.

7. A process for producing a high-purity silver material which comprises:
    (a) placing a silver feed in a crucible disposed in a furnace, said furnace comprising an inner cylinder which encloses said crucible and an outer cylinder which encloses the inner cylinder, said inner cylinder having a ceiling;
    (b) heating the silver feed within the crucible to a temperature not lower than 1065° C. and at a pressure not higher than 0.1 Pa, such that the silver evaporates and condenses on the ceiling of the inner cylinder to yield silver particles;

(c) recovering the silver particles in a recovery mold disposed beneath the crucible and within the inner cylinder for purifying the silver, such that gold, copper and other impurities having a lower vapor pressure than silver remain within the crucible, whereas sulfur, sodium and the other impurities having a higher vapor pressure than silver are withdrawn by a vacuum pump and are introduced in to a cooling trap disposed beneath the recovery mold, said impurities having a higher vapor pressure than silver being solidified in said cooling trap; and (d) drawing the silver through the recovery mold to form a silver wire, wherein said recovery mold is in a shape to carry out said drawing.

8. The process according to claim 7, wherein said silver feed is heated to a temperature of 1200 to 1350° C. and at a pressure of 0.02 Pa or less.

9. A process for producing a high-purity silver material which comprises:

(a) placing a silver feed in a crucible disposed in a furnace, said furnace comprising an inner cylinder which encloses said crucible and an outer cylinder which encloses the inner cylinder, said inner cylinder having a ceiling;

(b) heating the silver feed within the crucible to a temperature not lower than 1065° C. and at a pressure not higher than 0.1 Pa, such that the silver evaporates and condenses on the ceiling of the inner cylinder to yield silver particles; and (c) recovering the silver particles in a recovery mold disposed beneath the crucible and within the inner cylinder for purifying the silver, such that gold, copper and other impurities having a lower vapor pressure than silver remain within the crucible, whereas sulfur, sodium and the other impurities having a higher vapor pressure than silver are withdrawn by a vacuum pump and are introduced in to a cooling trap disposed beneath the recovery mold, said impurities having a higher vapor pressure than silver being solidified in said cooling trap, to produce a high-purity silver having a purity of at least 99.9999 weight %.

10. The process according to claim 9, wherein said silver feed is heated to a temperature of 1200 to 1350° C. and at a pressure of 0.02 Pa or less.

11. The process according to claim 9, wherein the temperature is 1300° C. and the pressure is 0.01 Pa.

* * * * *